(12) United States Patent
Bates, III et al.

(10) Patent No.: US 6,883,974 B2
(45) Date of Patent: Apr. 26, 2005

(54) OPTIC FIBER CONNECTOR WITH SPRING IN A SELF-CONTAINED CARTRIDGE

(75) Inventors: Charles Linsday Bates, III, Laguna Hills, CA (US); James Edward Novacoski, Yucaipa, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 56 days.

(21) Appl. No.: 10/370,916

(22) Filed: Feb. 21, 2003

(65) Prior Publication Data

US 2004/0165832 A1 Aug. 26, 2004

(51) Int. Cl.[7] .................................................. G02B 6/36
(52) U.S. Cl. .......................................... 385/76; 385/88
(58) Field of Search ............................. 385/78, 76, 77, 385/92, 60, 75, 88, 147

(56) References Cited

U.S. PATENT DOCUMENTS

| | | | |
|---|---|---|---|
| 4,178,068 A | | 12/1979 | Hoover |
| 4,687,288 A | | 8/1987 | Margolin et al. |
| 4,747,658 A | * | 5/1988 | Borsuk et al. ................. 385/78 |
| 5,481,634 A | | 1/1996 | Anderson et al. |
| 5,577,144 A | * | 11/1996 | Rossana et al. ............... 385/78 |
| 5,796,898 A | * | 8/1998 | Lee .............................. 385/78 |
| 5,913,001 A | * | 6/1999 | Nakajima et al. ............. 385/80 |
| 6,254,283 B1 | | 7/2001 | Novacoski et al. |
| 6,264,374 B1 | * | 7/2001 | Selfridge et al. ............. 385/78 |
| 6,428,215 B1 | * | 8/2002 | Nault ........................... 385/78 |
| 6,655,851 B1 | * | 12/2003 | Lee .............................. 385/78 |

* cited by examiner

*Primary Examiner*—Chandrika Prasad
(74) *Attorney, Agent, or Firm*—Roger C. Turner

(57) ABSTRACT

An optic fiber connector includes a self-contained optical fiber cartridge (12), that can be easily inserted into a passageway (16) of a connector housing (14), and easily removed and replaced, without exposing the coil spring (52) that urges the terminus forwardly. The cartridge includes a frame (20) that completely encircles the spring in all terminus positions and that also surrounds much of the terminus.

5 Claims, 2 Drawing Sheets

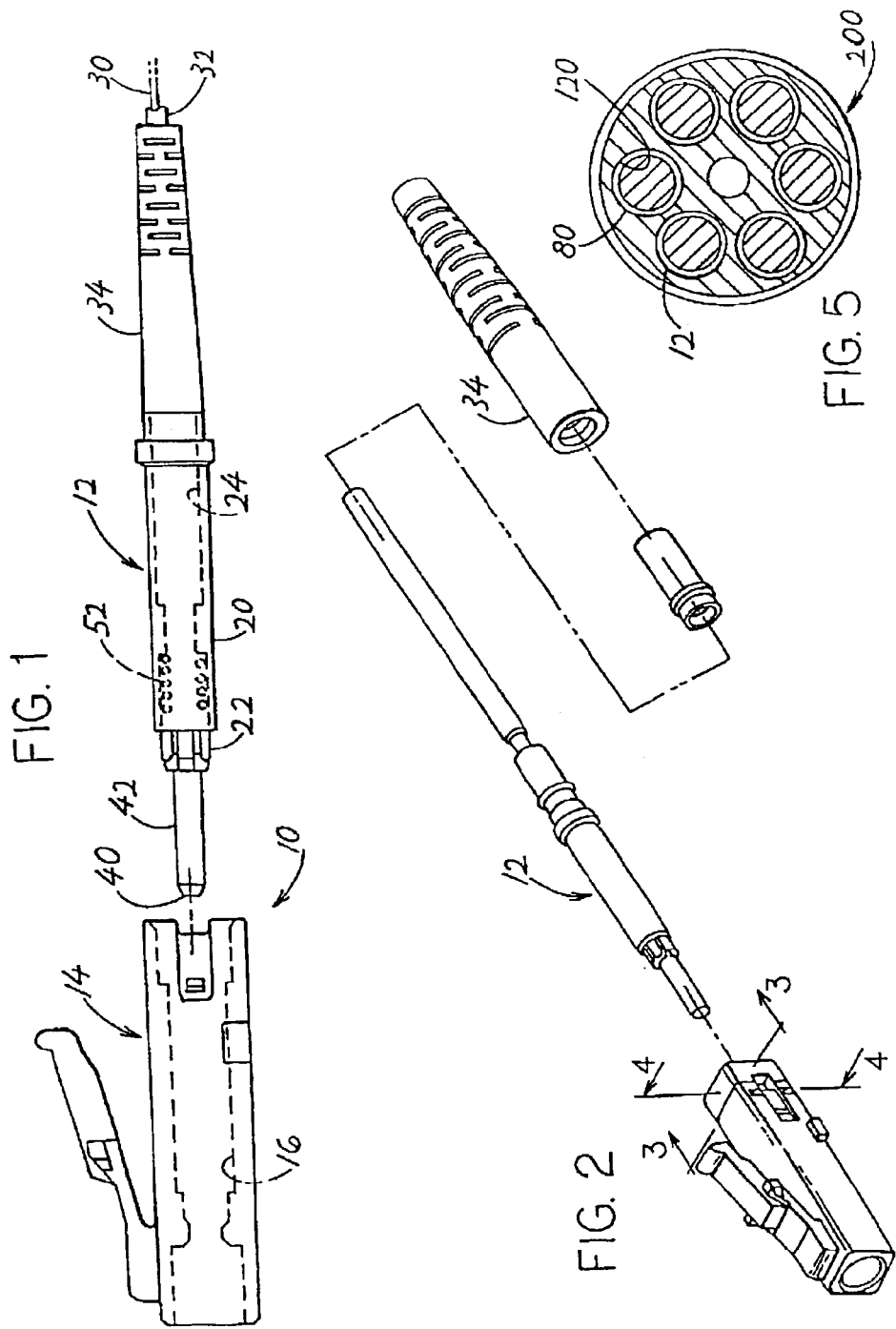

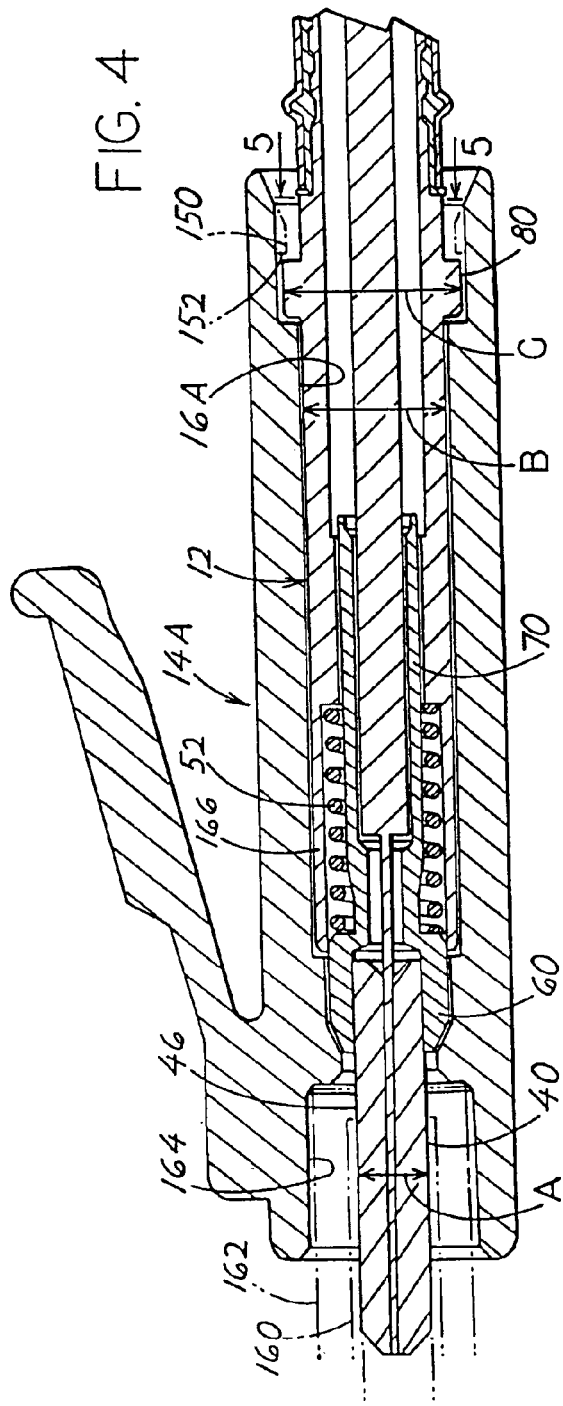

OPTIC FIBER CONNECTOR WITH SPRING IN A SELF-CONTAINED CARTRIDGE

BACKGROUND OF THE INVENTION

Optic fiber connectors in current use, include a housing with one or a plurality of passages that each holds a terminus through which an optic fiber projects. A coil spring lies in the passage to urge the terminus forwardly and allow the terminus to be pushed back by a mating terminus. A sheet metal clip prevents rearward movement of the terminus out of the passageway, but allows such removal when a special tool is inserted to expand the tines of the clip and pull out the terminus. In some prior connectors, the spring was removed with the terminus, and the spring was sometimes damaged when it caught on other parts at the rear of the connector. In another design, the spring remained in the passageway when the clip tines were expanded to remove the terminus. However, there often was damage to the spring when the removal tool was slid closely within the spring to expand the clip tines. The presence of a coil spring and a resilient clip through which or around which a removal tool had to be inserted, reduced the reliability of the connectors. Where the spring was left behind when the terminus was removed, the housing passageway had to be enlarged to retain the spring. A connector that enabled easy removal and replacement of a terminus, which minimized the number of deflectable and moving parts while protecting the movable parts especially the spring at all times, and which minimized the required diameter occupied by each terminus and surrounding parts would be of value.

SUMMARY OF THE INVENTION

In accordance with one embodiment of the present invention, a self-contained optic fiber cartridge is provided, that can fit into a small diameter connector housing passageway, and with the cartridge having a minimum number of deflectable and movable parts and providing maximum protection for such movable parts, especially a coil spring. The cartridge includes a tubular frame, a terminus that lies in a through passage of the frame, and a coil spring that also lies in the passage. The coil spring has a rear spring end abutting an inner shoulder in the frame and has a front spring end abutting a body shoulder that lies rearward of the front end of the frame, in all positions of the terminus.

An easily operated retainer at the rear end of a connector housing passageway, enables easy removal and replacement of the cartridge. The cartridge does not require a deflectable clip for removing the terminus from the frame because the terminus is not removable from the frame. The spring is never exposed, either to the surroundings when the cartridge is removed or to a removal tool. The coil spring lies closely around a small diameter terminus body rear portion and the frame is thin immediately around the coil spring, so the cartridge has a small outside diameter.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded side elevation view of a connector housing and of an optic fiber cartridge of the present invention.

FIG. 2 is an exploded front isometric view of the housing and cartridge of FIG. 1.

FIG. 3 is a sectional view taken on line 3—3 of FIG. 2.

FIG. 4 is a sectional view taken on line 4—4 of FIG. 2, but showing a modified retainer at the rear of the housing, and with the retainer body rear end not yet swaged.

FIG. 5 is a sectional view of a connector with multiple passageways that each holds a cartridge of the design as taken on line 5—5 of FIG. 4.

DESCRIPTION OF THE PREFERRED EMBODIMENTS

FIGS. 1 and 2 illustrate a connector 10 which includes an optic fiber cartridge 12 and a housing 14 with a passageway 16 that receives the cartridge. The cartridge includes a frame 20 and a terminus 22 that extends through a through passage 24 of the frame. An optic fiber cable 30 extends through a bend limiting sleeve 32 and through a bendable coupling 34, and through the terminus to a tip 42 of a ferrule 40 of the terminus.

FIG. 3 shows that the terminus 22 includes a body 50 that holds the rear end of the ferrule 40, preferably in a press fit. A spring 52 has a rear end that abuts a largely forwardly-facing internal shoulder 54 of the frame 20 and that has a front end that abuts an external largely rearwardly-facing shoulder 56 on the terminus body. The terminus body has an enlarged front portion 60 with a front end forming a largely forwardly-facing shoulder 62 that abuts a largely rearwardly-facing internal shoulder 64 on the housing 14. FIG. 3 shows the terminus in its most forward position, wherein the entire spring 52 is protected by the frame 20. The body has a narrow rear portion 70 with a rear end 72 that is swaged, to form an external flange shoulder 73 that is in line with an internal frame shoulder 74 to limit forward movement of the terminus within the frame 20 and prevent substantial exposure of the spring 52, and to prevent the ferrule from falling out of the frame.

The frame 20 has an external flange 80 near its rear end, which is used in conjunction with a retainer 82 to releaseably hold the cartridge 12 in the housing passageway 16. It is possible to merely form a groove where the flange 80 lies, to provide a shoulder. The particular retainer 82 is in the form of a sheet metal clip with tines 86 that abut a largely rearwardly-facing shoulder 90 of the frame. A rear end of the clip abuts a forwardly-facing and clip-retaining housing rear shoulder 91. A tool can be inserted into the rear 92 of the housing passageway 16 (by first pulling the coupling 34 rearward) to expand the tines 86 and withdraw 12 from the housing passageway. Such tool does not slide across the spring 52 or against any part of the terminus, so it cannot damage the spring or terminus. As mentioned above, when the cartridge 12 lies outside of the housing, the spring is protected. Since the spring 52 is a permanent part of the cartridge, no clip is required to remove the terminus from the frame of the cartridge.

The cartridge is assembled by pressing the ferrule 40 rearwardly into the front portion 60 of the body. The optic fiber cable is prepared by stripping protective material from around the glass fiber 100 and inserting the glass fiber through a corresponding bore in the ferrule until the tip of the fiber lies slightly forward of the ferrule tip 42. The fiber tip is polished flush with the ferrule tip. A flowable epoxy has been placed in the bore 102 of the body to fix the cable in the terminus. The spring 52 has been earlier threaded onto the cable and is slid forwardly F against the body shoulder 56. The terminus, with the spring 52 thereon, is then slid rearwardly R into the front end of the through passage 44 of the frame 20. The rear end 72 of the terminus body is swaged to enlarge it so that it can abut the shoulder 74 of the frame to prevent the terminus from moving forwardly from the position shown in FIG. 3. The bendable coupling 34 is moved forward, the strength member 110 of the optic fiber cable is wrapped around a rear portion 112 of the frame, and a crimp sleeve 114 is crimped around them.

In FIG. 3, the body is formed with an elongated undercut recess 120 for receiving the clip retainer 82. The cartridge 12 is installed by merely inserting it forwardly into and through the housing passageway 16. Forward movement of the frame is limited by the frame front end 130 abutting a corresponding internal shoulder 132 of the housing. Also, a rear flange front end 134 abuts a housing internal shoulder 136 which also limits forward movement of the cartridge within the housing.

FIG. 4 illustrates a modified housing 14A that is identical to that of FIG. 3, except that the housing has interfering parts 150 on opposite sides of the housing passageway 16A, that deflect apart to allow the frame external flange 80 to pass therethrough, and which have largely forwardly-facing shoulders 152 that then prevent cartridge removal unless the interference parts 150 are spread apart. A variety of retainers can be used to hold the optic fiber cartridge 12 in place and allow its removal when necessary. The presence of the flange 80 facilitates operations of such releaseable retainers.

The cartridge 12 has a relatively small diameter C. The ferrule 40 is required to have a predetermined diameter A to fit into a standard diameter alignment sleeve 160 that is contained in an alignment cartridge 162 that fits into a recess 164 at the front end of the housing. The terminus body front portion 60 must have a somewhat larger diameter than the ferrule to robustly hold the rear end of the ferrule 40. The frame front end 166 can be thin and have only a slightly greater diameter than the terminus body front portion 60. The body rear portion 70 has a small diameter, so the spring 52 can readily fit between the inside of the frame front portion 166 and the outside of the body rear portion 70. This results in a cartridge of small diameter, with the flange 80 at the rear adding only a small addition diameter. In FIG. 4, the ferrule has a standard outside diameter A of 1.6 mm, the cartridge 12 has an outside diameter B of 3.3 mm (about 190% of A) along most of its length, and the flange 80 has an outside diameter C of 3.9 mm (about 240% of A). Where the housing holds a single terminus, this results in the cartridge being installable in a housing of small size. Where the housing has multiple passageways, the small diameter of each cartridge enables the multiple passageways of such connector to be closely spaced so that a large number of termini can be installed in a connector of small size. The fact that the body front portion 60 projects partially forward of the frame front end 130, results in a connector of smaller length.

FIG. 5 illustrates a connector 200 with six optic fiber cartridges 12 installed therein. A prior art installation, which included a releaseable retention clip that engaged the terminus body and a spring with space for a release tool to fit around or within the spring, might allow only five termini to be placed in a connector of the same diameter.

Thus, the invention provides a removable optic fiber cartridge that is self-contained, with a spring that biases a terminus forwardly, wherein the spring is protected against damage when it lies outside a connector housing and where the spring is protected against damage from any removal tool. This is accomplished by mounting a terminus and spring permanently within a frame to form an optic fiber cartridge, and providing for the cartridge to be insertable and retained, and later removable from a passageway in a connector housing. The elimination of a retention clip or the like within the frame of the cartridge, also results in a cartridge of small diameter, which allows the termini to be mounted at small spacings in a connector that has multiple termini, or to allow the cartridge to be mounted in a connector housing of small size.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A self-contained optic fiber cartridge, comprising:
   a frame having a through passage with a largely forwardly-facing and spring-engaging frame internal first shoulder and with a largely rearwardly-facing frame second shoulder;
   a terminus which lies partially in said frame through passage, said terminus including a body having a through body bore and a ferrule having a rear end lying in a front portion of said body bore, said ferrule projecting forward of said body, said body having a largely rearwardly-facing spring-engaging first body shoulder lying forward of said spring-engaging frame first shoulder;
   a coil spring lying in said passage and having a rear spring end abutting said spring-engaging frame internal first shoulder and a front spring end abutting said first body shoulder.
   said body having a rear portion with a largely forwardly-facing body second shoulder lying rearward of said frame second shoulder and in line with said frame second shoulder to engage said frame second shoulder when said body moves forward, whereby to prevent said terminus from falling out of the frame.

2. The cartridge described in claim 1 wherein:
   said body is formed of metal and has a tubular rear portion, and said body second shoulder is a swaged rear end of said body.

3. A method for constructing an optic fiber connector that includes an optic fiber terminus with a terminus body having an enlarged front end, with a body rear portion of smaller diameter than said front end, and with a largely rearwardly-facing body second shoulder at the rear of said body front end that includes a coil spring extending around said body rear portion, comprising:
   inserting said terminus and spring rearwardly into the front end of a passage of a tubular frame, until a rear end of the spring abuts a largely forwardly-facing internal shoulder of the frame and a front end of the spring abuts said body second shoulder with the body second shoulder lying rearward of a front end of the frame;
   enlarging the rear end of the body rear portion so it cannot pass through said frame passage, so said terminus cannot fall forwardly out of said frame passage.

4. The method described in claim 3 wherein:
   said step of enlarging said rear end of said body rear portion comprises swaging it.

5. A combination of a self-contained optic fiber cartridge, an optic cable connected to said cartridge and a connector housing that can hold the cartridge, wherein:
   said housing has a through passageway with front and rear passageway portions, said front passageway portion having a largely rearwardly-facing housing first shoulder;

said cartridge includes a frame that lies in said housing passageway, a terminus, and a spring, said frame having a passage that surrounds all of said spring and a portion of said terminus, said terminus including a body having a front end that forms a largely forwardly-facing body front shoulder that is positioned to engage said housing first shoulder;

said frame has a portion forming a largely rearwardly-facing frame shoulder;

said body has a through bore that receives a portion of said optic cable, said body has a tubular rear portion that extends rearward of said spring, and said tubular rear portion of said body has an outward flange that lies rearward of and in line with said rearwardly-facing frame shoulder.

\* \* \* \* \*